United States Patent [19]

Bobel

[11] Patent Number: 5,502,635
[45] Date of Patent: Mar. 26, 1996

[54] PARALLEL RESONANT INTEGRATED INVERTER BALLAST FOR GAS DISCHARGE LAMPS

[75] Inventor: Andrzej A. Bobel, 201 Norman Ct., Des Plaines, Ill. 60016

[73] Assignee: Andrzej A. Bobel, Des Plaines, Ill.

[21] Appl. No.: 309,037

[22] Filed: Sep. 20, 1994

Related U.S. Application Data

[63] Continuation-in-part of Ser. No. 5,817, Jan. 19, 1993, Pat. No. 5,371,438.
[51] Int. Cl.⁶ .................................................. H05B 37/00
[52] U.S. Cl. .................... 363/132; 315/209 R; 315/307; 315/224
[58] Field of Search ........................ 315/209 R, 209 T, 315/209 CD, 214, 224–226; 363/132, 280, 19, 74; 323/277, 280, 265

[56] References Cited

U.S. PATENT DOCUMENTS

| | | | |
|---|---|---|---|
| 4,723,098 | 2/1988 | Grubbs | 315/306 |
| 5,049,790 | 9/1991 | Herfurth et al. | 315/291 |
| 5,150,013 | 9/1992 | Bobel | 315/209 R |

*Primary Examiner*—Peter S. Wong
*Assistant Examiner*—Aditya Krishnan
*Attorney, Agent, or Firm*—Hill, Steadman & Simpson

[57] ABSTRACT

A power line-operated electronic converter is adapted to deliver a relatively constant magnitude high frequency signal to a load(112) and is operable to draw a substantially sinusoidal current from the AC voltage source (101). The converter has DC input terminals (B+,B−) having a capacitor (105) connected therebetween. First and second rectifier bridges (103,104) are coupled to the DC input terminals. A resonant oscillator circuit (108) is coupled to the DC input terminals and to the transistor inverter employing a resonant inductor (111) and a resonant capacitor (110). An input-output feedback is implemented by coupling of a voltage developed across the resonant inductor to a differential voltage proportional to a difference of a voltage developed across DC input terminals and a voltage provided by a rectified AC voltage source, and modulation of frequency of oscillation in proportion to the differential voltage.

24 Claims, 11 Drawing Sheets

PARALLEL RESONANT INTEGRATED INVERTER BALLAST FOR GAS DISCHARGE LAMPS

This application is a continuation-in-part of U.S. patent application Ser. No. 08/005,817, filed Jan. 19, 1993, now issued as U.S. Pat. No. 5,371,438 on Dec. 6, 1994.

BACKGROUND OF THE INVENTION

1. Field of the Invention

This invention relates to single stage electronic energy converters operated from alternating power line and capable of supplying, at the output, a load such as gas discharge lamp.

2. Description of Prior Art

The electronic energy converters, or as sometimes called "switching power supplies", need to operate directly from the alternating power line. Electric utility companies are setting requirements for specific groups of electricity-powered appliances in regards to power quality drawn by these appliances.

The electronic ballast, as one of the appliances, is used in large quantities in lighting fixtures. In general, to meet the industry requirements in regards to power quality, an electronic ballast has to meet two fundamental requirements: (i) draw power from the power line with a power factor (PF) of at least 0.9, and (ii) draw current from the power line with total harmonic distortion (THD) of less than 20 percent.

The electronic ballast has to meet other requirements related to compatibility with a lamp-load. It shall provide lamp current crest factor of less than 1.7, where the "crest factor" is equal to a peak magnitude of the lamp current divided by its effective (RMS) value. This is related to maximum allowable modulation of the lamp current magnitude, which is responsible for light flicker and poor lamp efficacy expressed in lumens of light produced from each watt of power consumed. It is desirable to have constant power to be delivered to the lamp load over the entire cycle of the voltage supplied by the power line.

In order to convert the low frequency power line alternating voltage (120V/60 Hz or 220V/50 Hz) to high frequency (typically from 10 kHz to 100 kHz) alternating voltage or current source, one has to rectify the signal from the power line to a DC voltage which later is converted, by switching transistors, to the high frequency source.

Conventional off-line rectifiers have a capacitive smoothing filter located beyond a diode rectifier circuit. This smoothing capacitor causes harmonic distortion of the current waveforms during periods in which the rectified output is higher than the voltage over the smoothing capacitor, and during which time the capacitor charges up. This charging time, or conduction angle, is very small if a large capacitor is used, and all the required charge has to be loaded into the capacitor in a short period of time. This results in a large current output from the rectified power line source. These current spikes increase the harmonic content of the power supply, and when large number of ballasts are operated from the power line, this increased harmonic distortion causes a poor power factor in the supply. This situation is not accepted upon by electricity supply authorities and causes interference with other electrical equipment.

Techniques for improving power factor include passive waveform shaping methods. One of them is described in U.S. Pat. No. 5,150,013 issued to BOBEL. This method requires an inductor to operate in resonant mode with a capacitor, and the resonant frequency is approximately 180 Hz when power line frequency is 60 Hz. It is an inexpensive and reliable method. However, the inductor must be large in size.

It is known to use a storage conversion principle, whereby an inductor is controlled at high frequency in order to allow charging of the smoothing capacitor over a wide conduction angle. The system, however, requires a control circuit for the storage converter, known also as a "boost converter", in order to regulate the discharge of energy from the storage inductor. Such use of the storage conversion principle requires additional noise filtering, because a large amount of noise is being generated by switching devices. The circuit is very complex and expensive to produce. Furthermore, the second stage converter is necessary to convert the DC voltage source to the high frequency alternating voltage or current source. This type of circuit is described in U.S. Pat. No. 5,049,790 issued to Herfurth.

It is highly desirable to have a simple and low cost single stage electronic energy converter. Such a circuit shall have low parts count and cost, it shall be adaptable to all power line voltages and lamps kinds, it shall be easily manufacturable in large quantities with great repeatability as required by industry quality standards, it shall meet the power quality standards and draw power from the power line with near-sinusoidal current waveform and provide near-constant power to the lamp over the entire cycle of power line voltage waveform.

This applicant is not aware of any parallel-resonant electronic energy converters operable directly from an alternating power line which will meet all of the above-mentioned requirements.

SUMMARY OF THE INVENTION

In accordance with the invention, there is provided an energy conversion device employing an electronic converter having DC input terminals and being adapted to deliver a high frequency alternating signal at its output terminals and comprising:

voltage source means providing an input current;

first rectifier means having first AC input terminals and first DC output terminals wherein said AC input terminals are connected to the voltage source means;

second rectifier means having second AC input terminals and second DC output terminals wherein said first and second DC output terminals are coupled to the DC input terminals;

capacitor means coupled to the DC input terminals;

semiconductor switching means coupled to the DC input terminals;

resonant oscillator circuit means coupled to the DC input terminals and to the semiconductor switching means wherein said resonant oscillator circuit draws a current from the DC input terminals, and further wherein the resonant oscillator circuit develops an alternating voltage at the output terminals and said oscillator circuit comprises: (i) a resonant inductor having a primary winding coupled to the output terminals; (ii) a resonant capacitor coupled to the output terminals and in parallel with the primary winding of the resonant inductor; ,(iii) a switching feedback loop coupled to the resonant inductor and responsive to instantaneous magnitude of the alternating voltage and operable to deliver to the semiconductor switching means a switching signal proportional to the instantaneous magnitude of the alternating voltage; and input-output means coupled to the resonant inductor and connected to AC input terminals of the second rectifier means wherein the input-output means provides (i) a substantially constant magnitude high frequency signal at the output terminals, and (ii) a substantially sinusoidal input current.

The device further comprising the voltage source means as a power line AC voltage source.

The device further comprising the first and second rectifier means each as a full wave rectifier bridge.

The device further comprising the capacitor means as a polarized electrolytic capacitor.

The device further comprising the semiconductor switching means connected in a bridge configuration having a pair of npn bipolar transitors.

The device further comprising the semiconductor switching means connected in push-pull configuration having a pair of npn bipolar transistors.

The device further comprising a load in the form of a gas discharge lamp coupled to the output terminals by a load winding loosely coupled with the primary winding and having an impedance associated with a leakage inductance operating as load current limiting frequency dependent impedance.

In the device of the present invention is provided a parallel resonant integrated inverter circuit having a ballasting inductor and equipped with the input-output means to provide (i) a substantially constant magnitude high frequency signal at the output terminals, and (ii) a substantially sinusoidal input current.

In such a device the input-output means is as feedback winding magnetically coupled to the ballasting inductor and connected to the AC input terminals of the second rectifier means.

According to the present invention the input-output means is further provided as a combination of: (i) a winding magnetically coupled with the resonant inverter and the second rectifier means and (ii) capacitor connected between the resonant inverter means and the second rectifier means.

In such a device the input current waveform is substantially sinusoidal, the total harmonic distortion of the current is below 20%, power is drawn from the power line with power factor of 99%, lamp current crest factor is below 1.7.

Other objects and advantages of the present invention shall be made clear in the following description of the invention detailed with reference to various embodiments of the invention as shown in the accompanying drawings.

DESCRIPTION OF THE PREFERRED EMBODIMENTS

Figure 1:
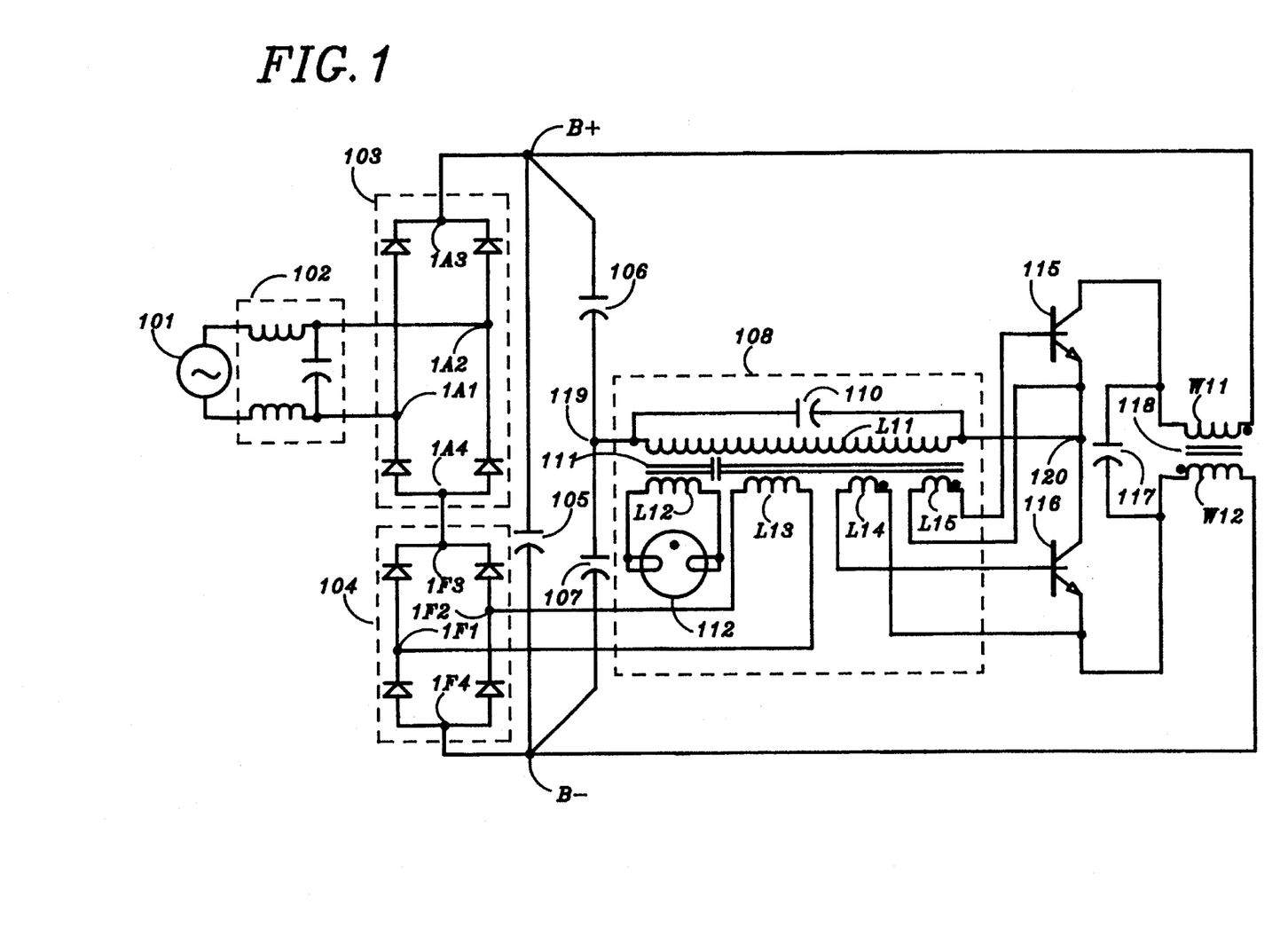
FIG. 1 illustrates a circuit diagram of an embodiment of the present invention.

FIG. 1 schematically illustrates the main preferred embodiment of the invention in the form of an electrical circuit diagram.

In FIG. 1, a voltage source 101 represents an ordinary 120 Volt/60 Hz electric utility power line and is connected through a RFI/EMI filter 102 to AC input terminals 1A1 and 1A2 of a full wave rectifier bridge 103. The bridge 103 is made of four rectifier diodes and has a pair of DC output terminals 1A3, 1A4, where the terminal 1A3 is a positive and the terminal 1A4 is a negative. Four diodes are connected in a full wave rectifier bridge 104 forming two AC input terminals 1F1, 1F2 and two DC output terminals 1F3, 1F4, where the terminal 1F3 is a positive and the terminal 1F4 is a negative. The terminal 1A4 of the bridge 103 is connected to the terminal 1F3 of the bridge 104. The circuit of FIG. 1 has a pair of DC input terminals B+, B–. The terminal 1A3 of the bridge 103 is connected to the terminal B+, and the terminal 1F4 of the bridge 104 is connected to the terminal B–. An electrolytic capacitor 105 of relatively small value is connected to terminals B+ and B–. Two capacitors (having equal value of 0.47 uF) are connected in series between the DC input terminals B+,B– via a node 119.

A half-bridge inverter 109 has a bipolar transistor 115 (of the type MJE 13005) connected at its emitter electrode to a node 120. A further npn transistor 116 (like the transistor 115, of the type MJE 13005) of the inverter 109 has its collector electrode connected to the node 120. A snubber capacitor 117 is connected between the collector electrode of the transistor 115 and emitter electrode of the transistor 116.

An inductor 118 has two equal but separate windings W11 and W12. The collector electrode of the transistor 115 is connected to the terminal B+ through winding W11, and the emitter electrode of the transistor 116 is connected to the terminal B– through winding W12.

A parallel-resonant tank circuit 108 has a resonant inductor 111 equipped with a primary winding L11, a secondary load winding L12, an auxiliary energy feedback winding L13, and a pair of switching feedback windings L14, L15. The primary winding L11 is connected between nodes 119 and 120. A resonant capacitor 110 is connected between nodes 119 and 120. The auxiliary winding L13 is connected to the terminals F1,F2 of the bridge 104. The switching feedback winding L15 is connected between base-emitter junction of the transistor 115; and the switching feedback winding L14 is connected between base-emitter junction of the transistor 116. The switching feedback windings L14 and L15 are tightly magnetically coupled with the primary winding L11. The secondary load winding L12 is loosely magnetically coupled with the primary winding L11. A leakage inductance associated with such loose coupling is a factor of the frequency dependent impedance implemented to control a current delivered to a lamp-load 112 which is connected to the winding L12.

Figure 2:
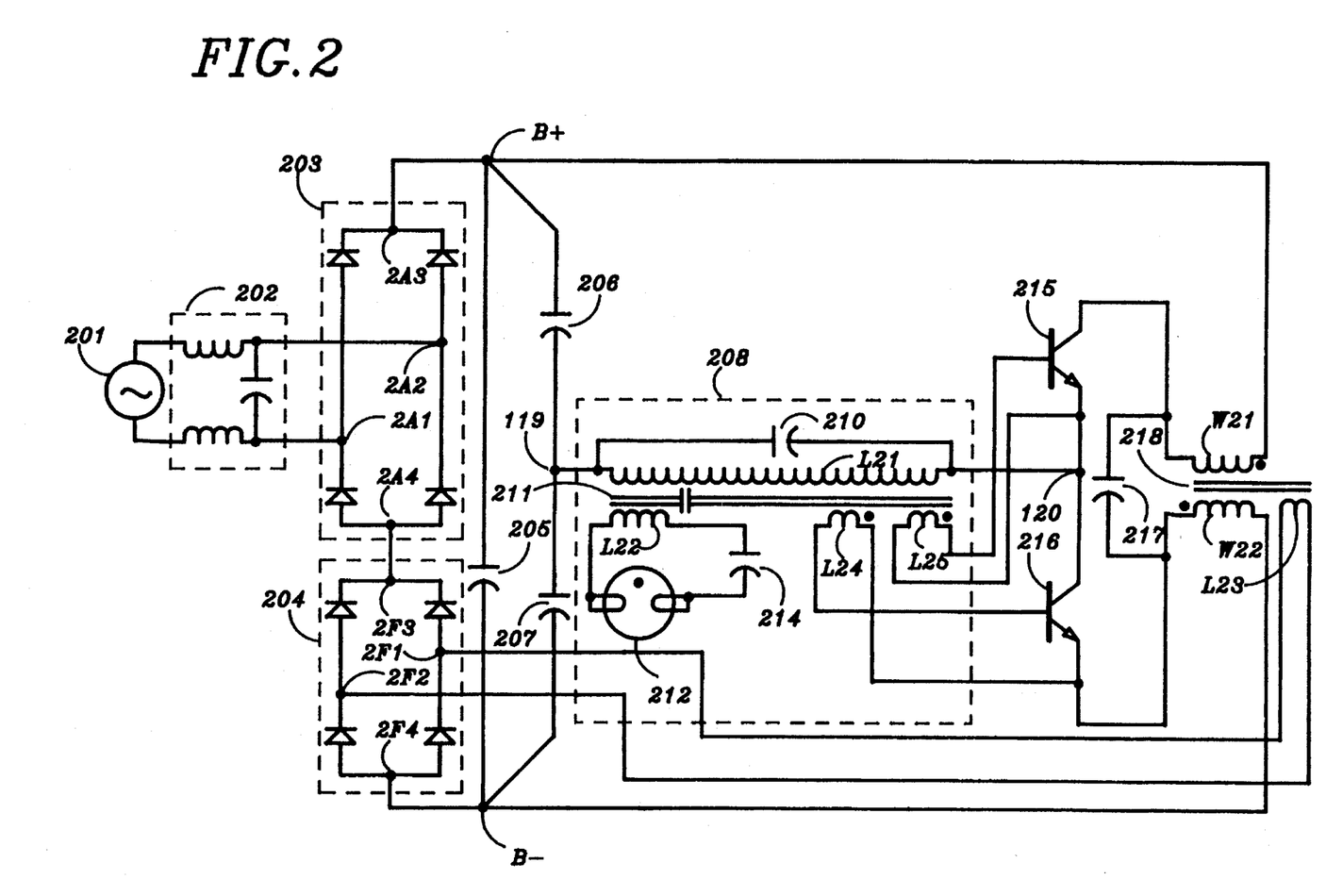
FIG. 2 illustrates a circuit diagram of another embodiment of the present invention.

In FIG. 2 which is a second embodiment of the invention, the leakage inductance of the circuit of FIG. 1 is replaced with a capacitor 214 to control a current delivered to a lamp-load 212, and a winding L22 is here tightly coupled with a primary winding L21. Also, the auxiliary winding L13 of the circuit of FIG. 1 is here replaced with a winding L23 magnetically coupled with an inductor 218. The inductor 218 is equipped with a auxiliary winding L23 which is connected to the terminals 2F1, 2F2 of the bridge 204.

Figure 3:
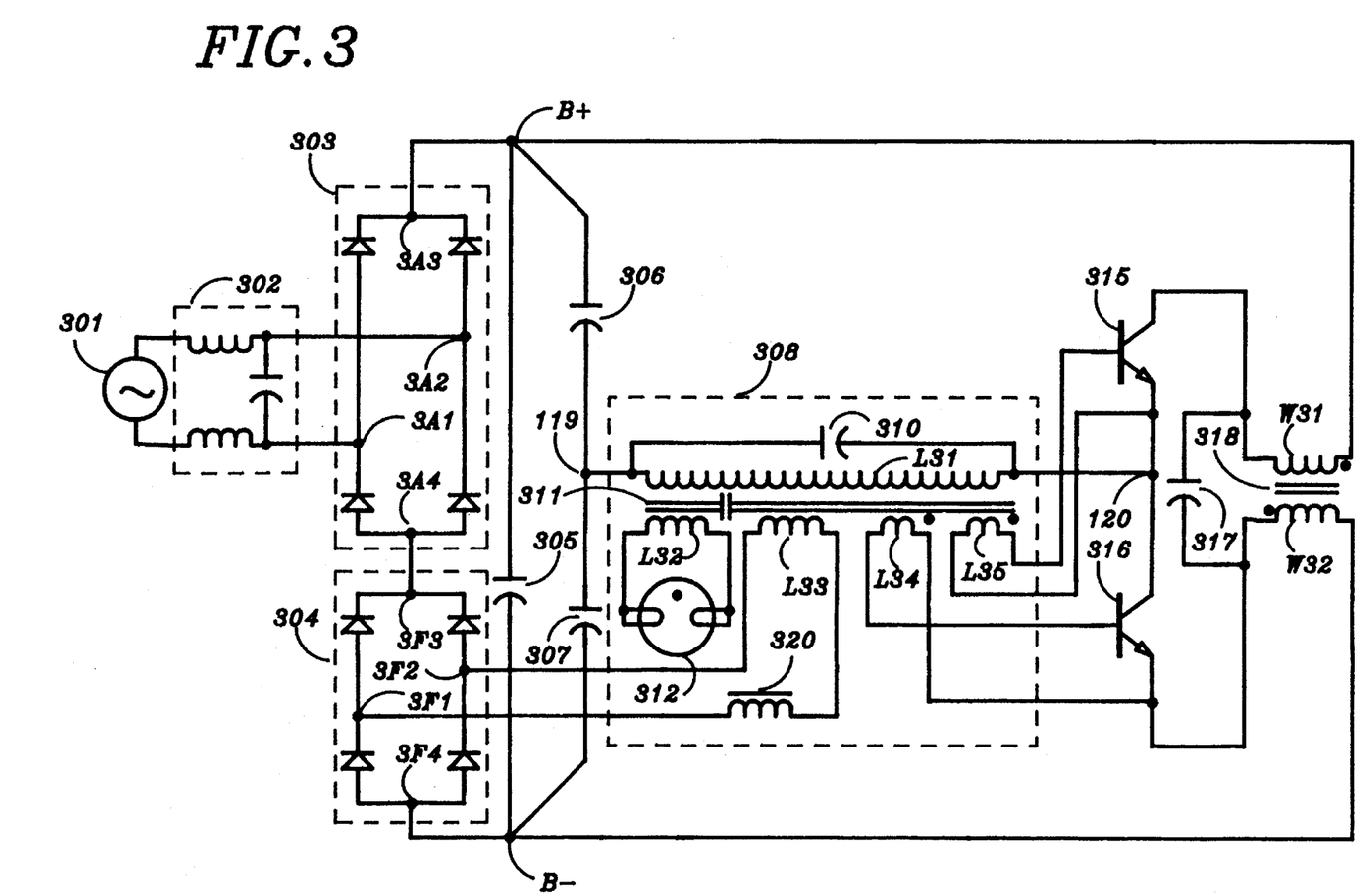
FIG. 3 illustrates a schematic diagram of yet another embodiment of the present invention.

In FIG. 3 which is a third embodiment of the invention, an inductor 320 is connected in a series circuit loop with a winding L33 and terminals 3F1 and 3F2 of the bridge rectifier 304. All other aspects of this circuit are identical to the circuit described in FIG. 1.

Figure 4:
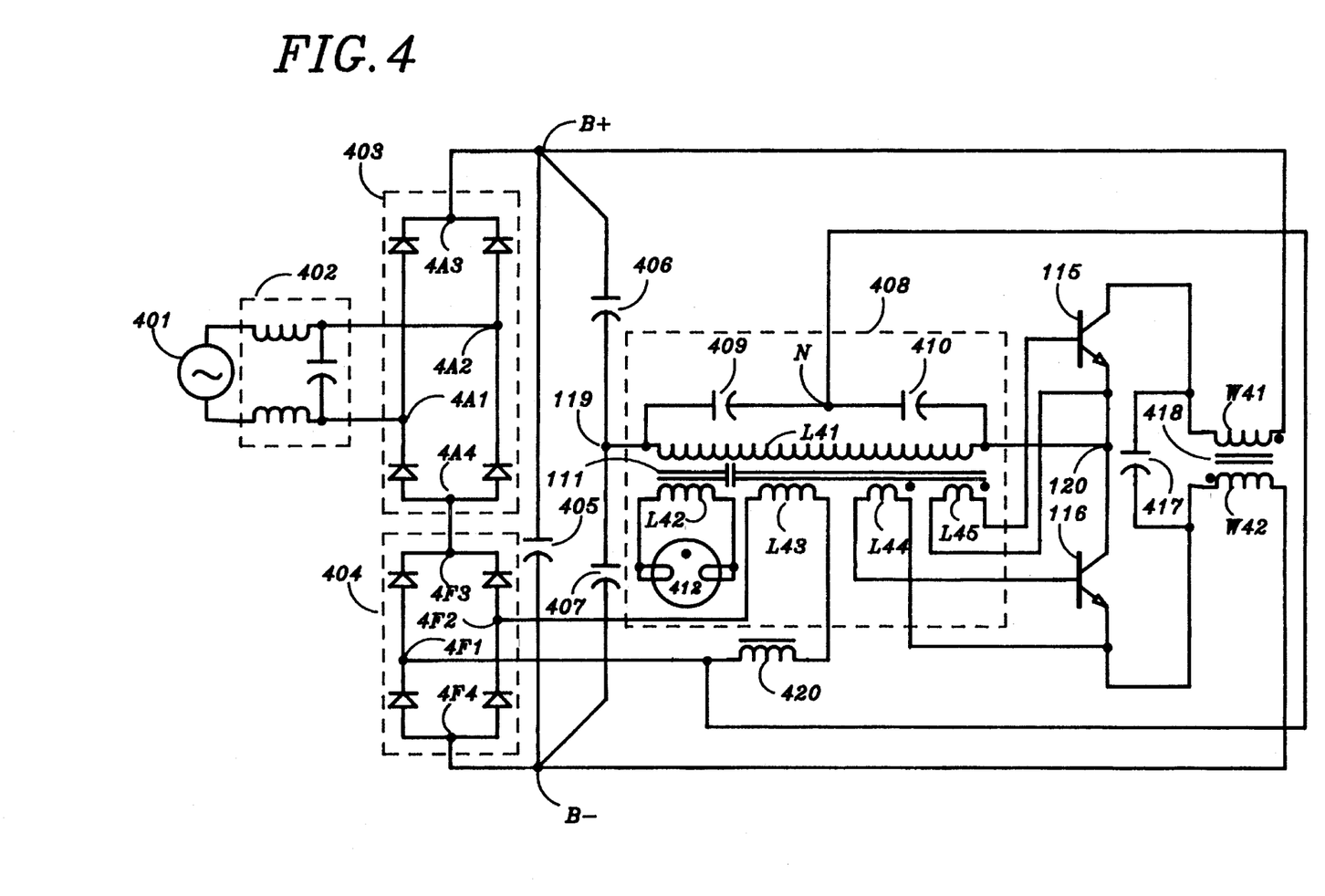
FIG. 4 illustrates a circuit diagram of an embodiment of the present invention.

In FIG. 4 which is an alternate version of the circuit of FIG. 3, the resonant capacitor is in the form of two serially connected capacitors 409 and 410 via a node N. The node N is connected to a terminal 4F1 of a bridge 404.

Figure 5:
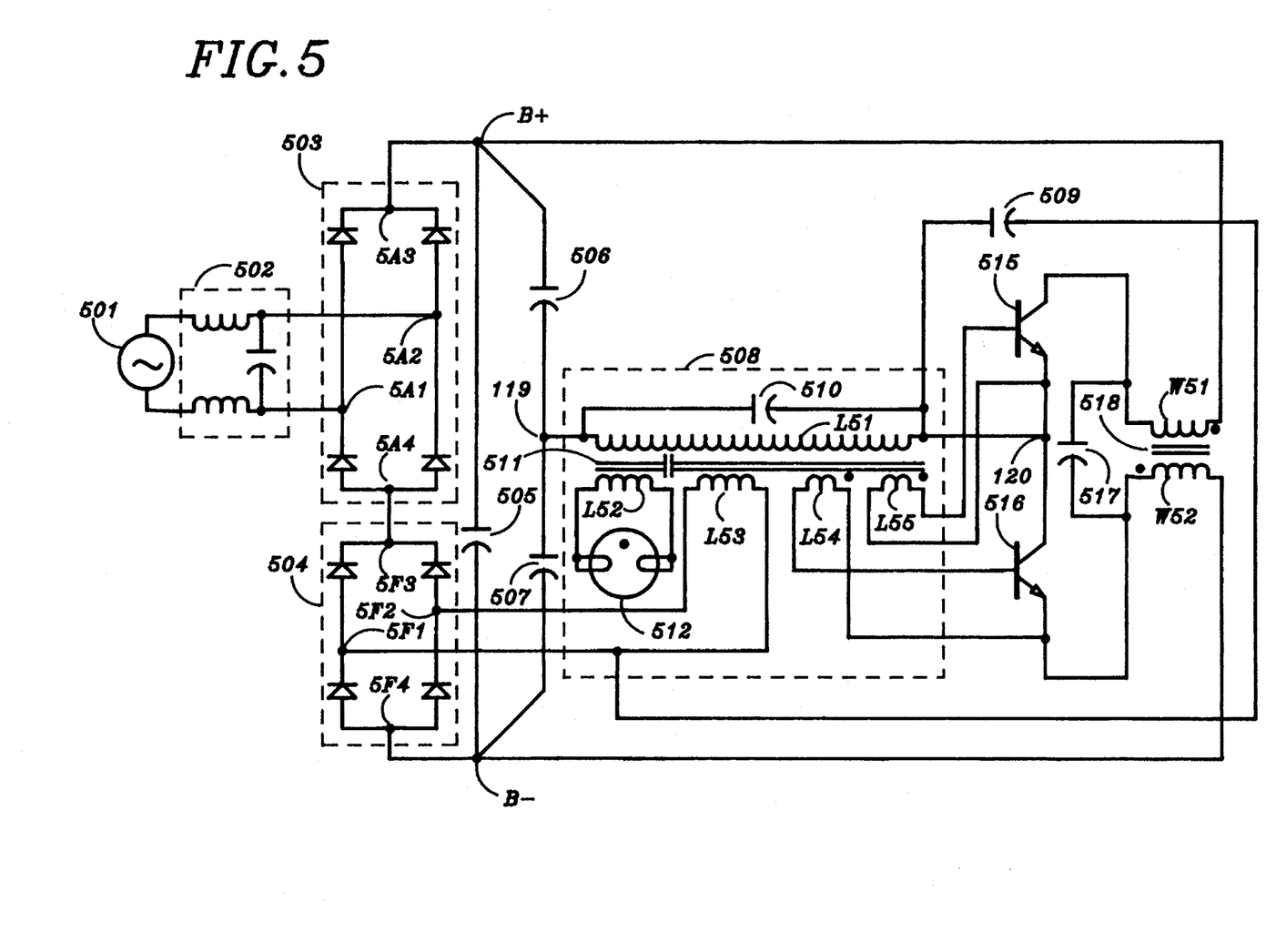
FIG. 5 illustrates a circuit diagram of an embodiment of the present invention.

In FIG. 5 which is an alternative version of the circuit of FIG. 1, a secondary winding L53 of the resonant inductor 511 is connected to the terminals 5F1 and 5F2 of the bridge rectifier 504. Additionally, a capacitor 509 is connected between the resonant inverter circuit 508, specifically between a node 120 and one of the two terminals 5F1, 5F2 of the bridge rectifier 504, in this case between the node 120 and the terminal 5F1. As a further alternative, the capacitor 509 may be connected to any terminal of the resonant inverter 508 or ballasting inductor 518.

Figure 6:
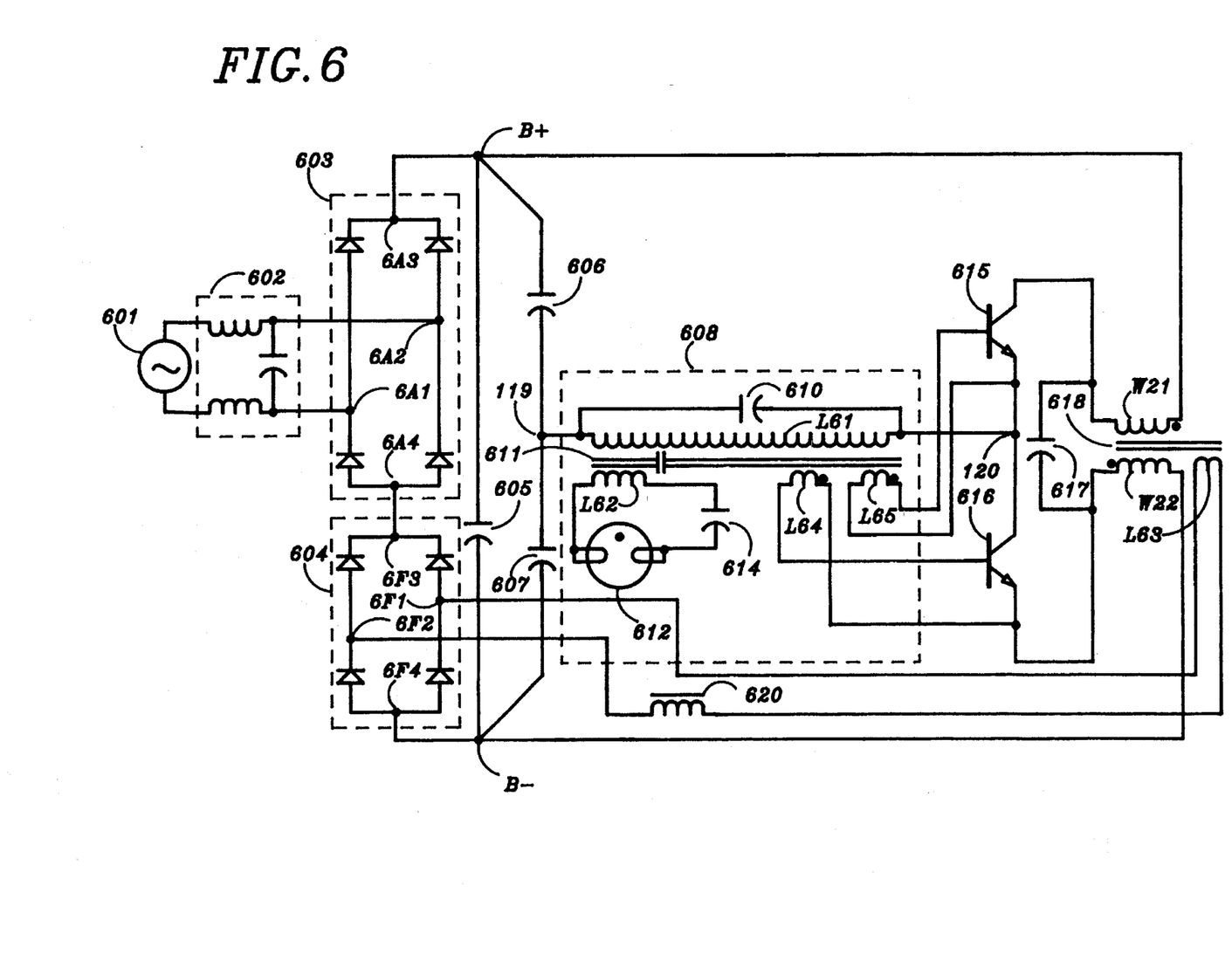
FIG. 6 illustrates a circuit diagram of an embodiment of the present invention.

In FIG. 6 which is an alternative version of the circuit of FIG. 2 wherein, an inductor 620 is connected in a series circuit loop with a winding L63 magnetically coupled with a ballsting inductor 618. All other aspects of this circuit of FIG. 6 are identical to the circuit described in FIG. 2.

Figure 7:
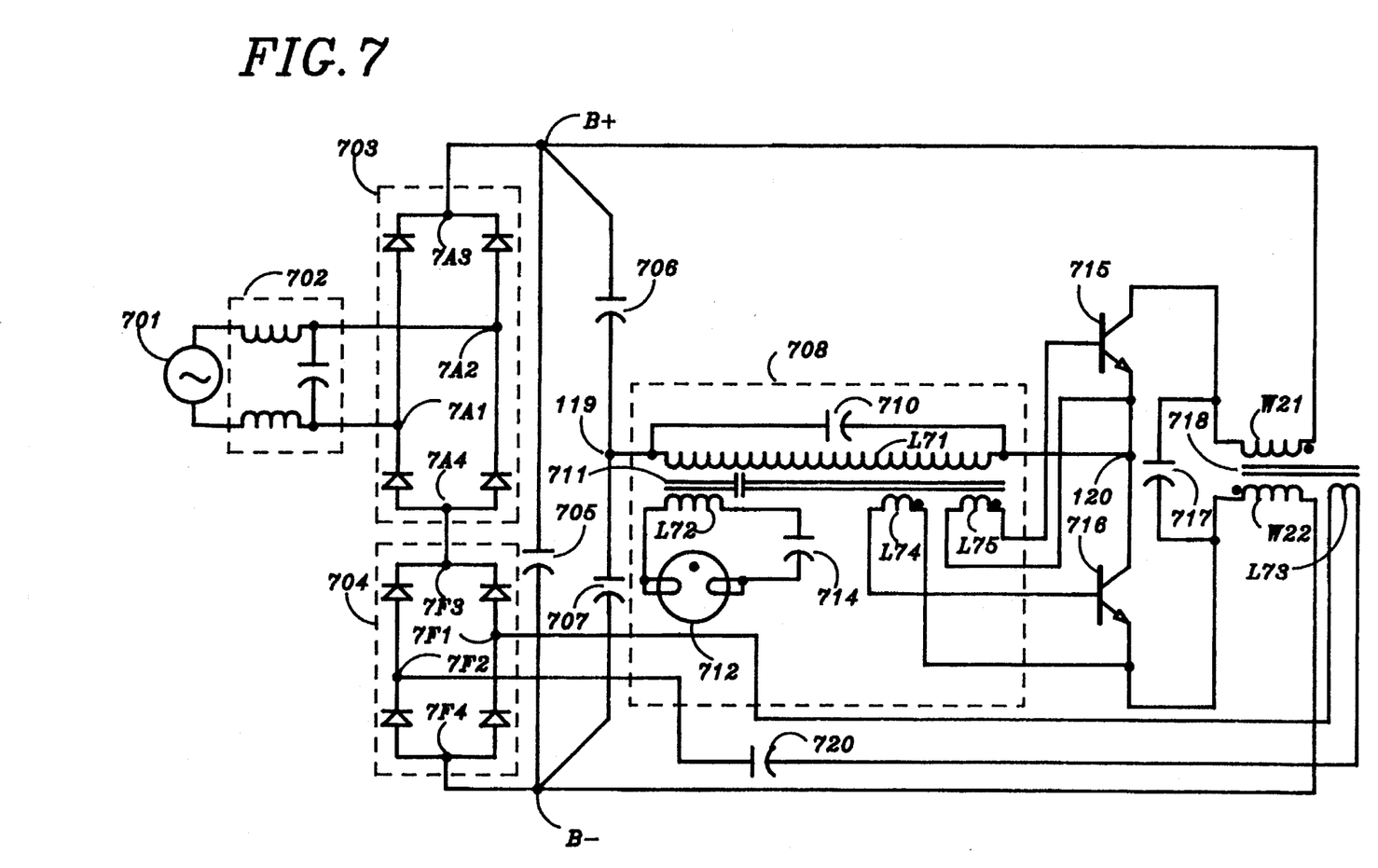
FIG. 7 illustrates a circuit diagram of another embodiment of the present invention.

In FIG. 7 which, is another alternative version of the circuit of FIG. 2 a capacitor 720 is connected in a series circuit loop with a winding L73 magnetically coupled with a ballasting inductor 718. All other aspects of this circuit of FIG. 7 are identical to the circuit described in FIG. 2.

Figure 8:
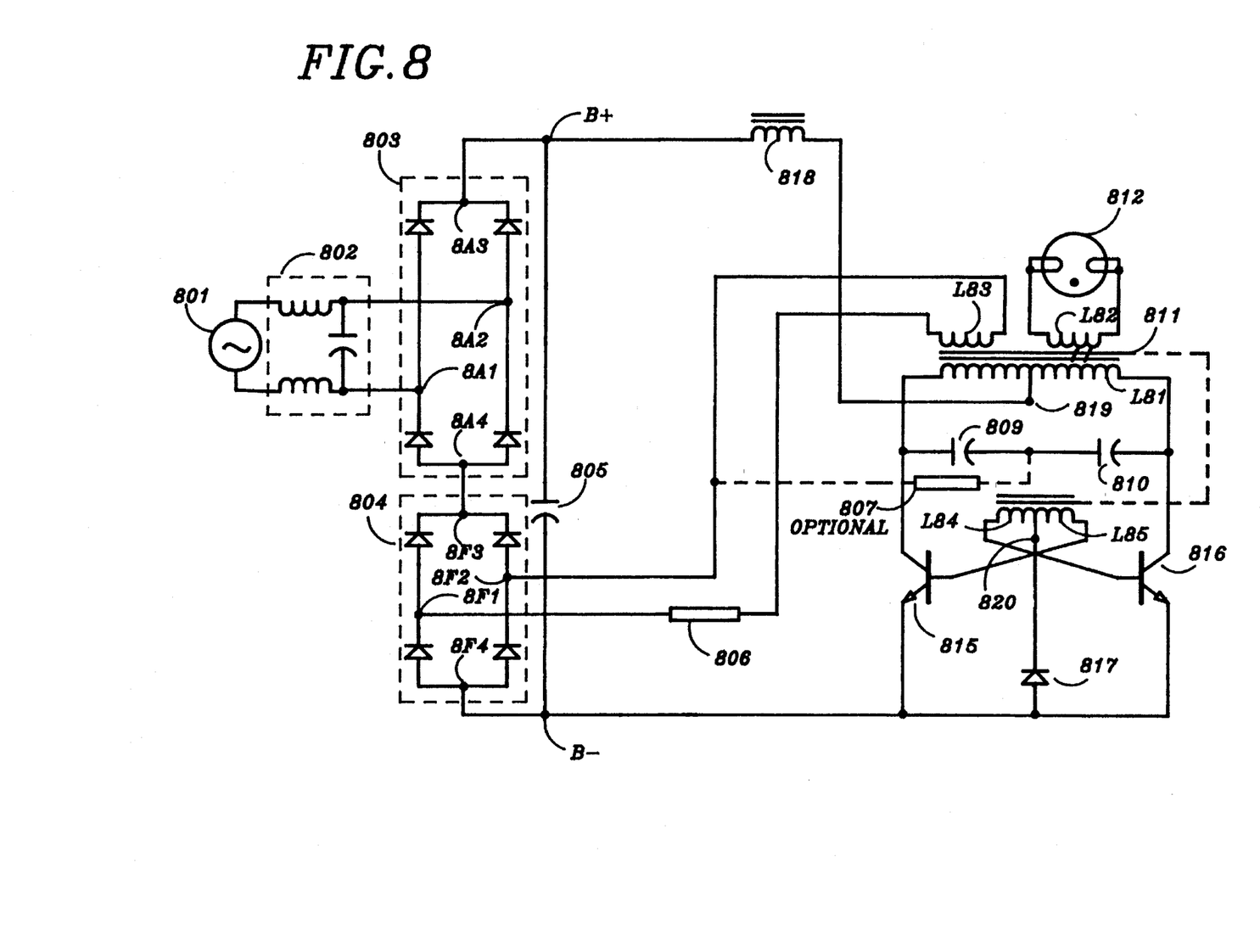
FIG. 8 illustrates a circuit diagram of another embodiment of the present invention.

In FIG. 8 which is yet another embodiment of the present invention, the entire half-bridge configuration of the circuit of FIG. 1 is replaced with a push-pull configuration. Two transistors 815, 816 are connected with the emitter electrodes to the terminal B−. A resonant inductor 811 has its primary winding L81, equipped with a middle tap at a node 819, is connected between collector electrodes of the two transistors 815,816. A resonant capacitor 810 is connected between collector electrodes of the transistors 815,816. The resonant inductor 811 is equipped with switching feedback windings L84, L85 to provide a switching signal to the transistors 816,815, respectively. A ballasting inductor 818 is connected between terminal B+ and the node 819 of the primary winding L81. A load 812 is connected across a secondary winding L82 of the resonant inductor. The winding L82 is loosely coupled with the primary winding L81, and a leakage inductance associated with such loose coupling has a frequency dependent impedance which controls the magnitude of the current flowing through the load 812. The resonant inductor 811 is equipped, additionally, with an auxiliary energy feedback winding L83 connected to the terminals 8F1, 8F2 of a bridge rectifier 804.

Figure 9:
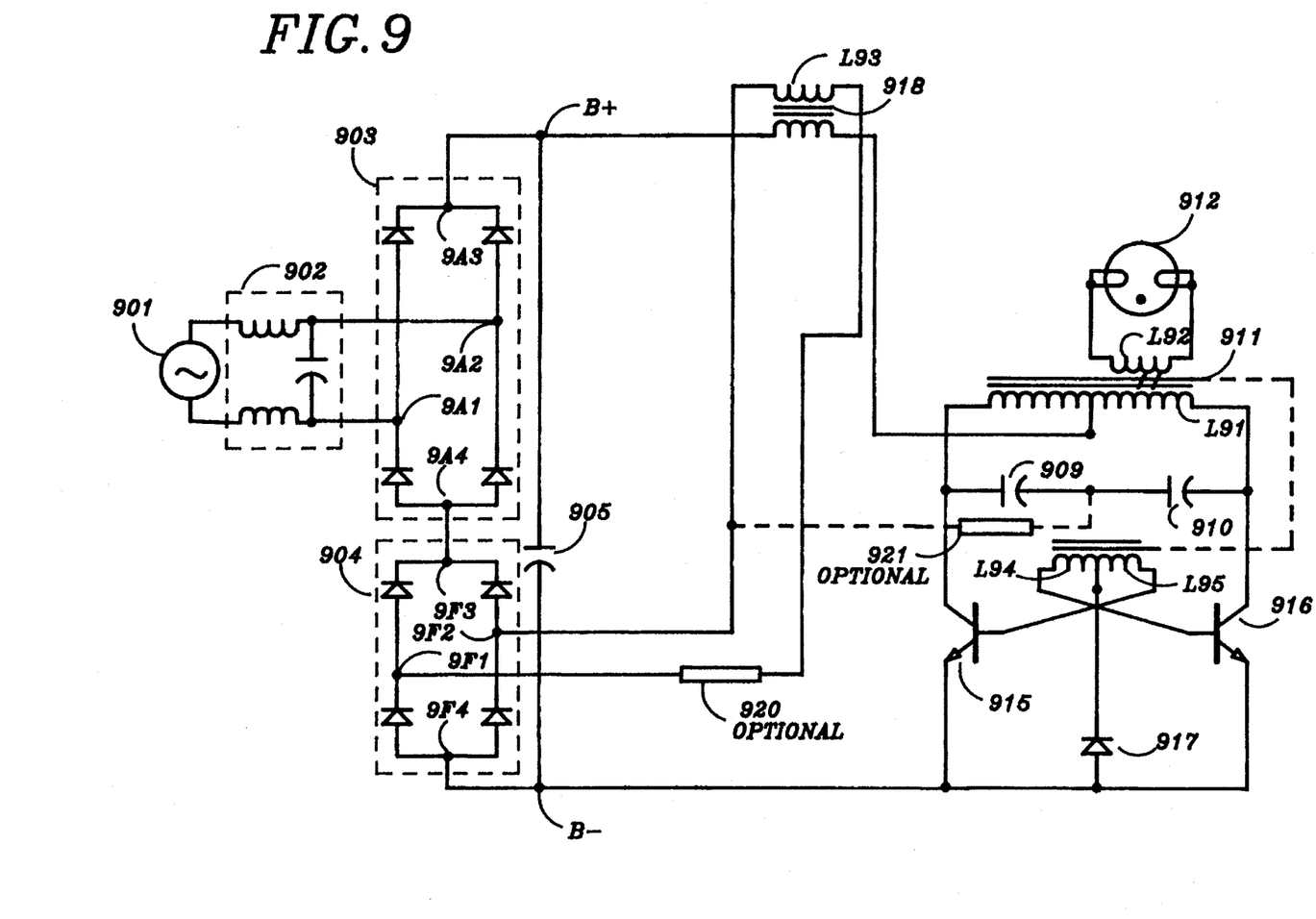
FIG. 9 illustrates a circuit diagram of another embodiment of the present invention.

In FIG. 9 which is an alternative version of circuit of FIG. 8, an optional impedance in the form of an inductor or capacitor is connected in a series circuit loop with the auxiliary energy feedback winding L93 coupled to the ballasting inductor 918. Furthermore, an optional impedance in the form of a capacitor or inductor is connected between resonant capacitors 909, 910 and one of the two terminals 9F1, 9F2 of the rectifier bridge 904.

DETAILS OF OPERATION

In order to clearly describe the operation of the device of FIG. 1, the auxiliary energy feedback winding L13 of the inductor 111 will be open. This means that no feedback will be provided to terminals 1F1,1F2 of the rectifier bridge 104.

Figure 10A:
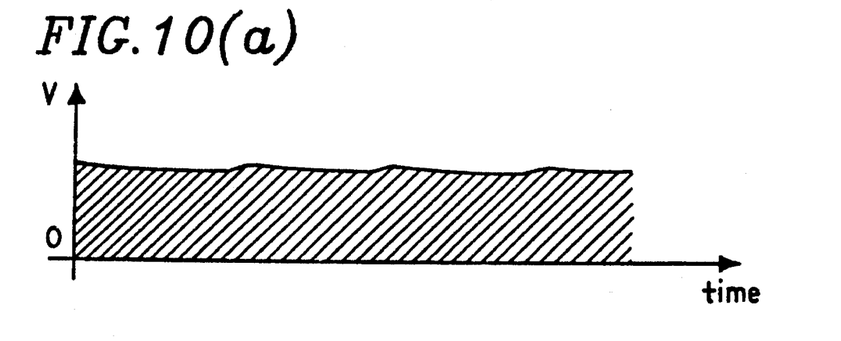
FIGS. 10(a)–10(d) illustrate graphs showing current and voltage waveforms associated with operation of an embodiment of the circuit of the present invention.

FIGS. 10(a)–10(d) indicate various current and voltage waveforms illustrative of the operation of the device of FIG. 1 without the feedback from the inductor 111. With reference to the waveforms of FIGS. 10(a)–10(d), the operation of the device of FIG. 1 (without the feedback from the inductor 111) is very similar to the device explained in U.S. Pat. No. 4,392,087 issued to Zansky. The only difference is one of the objects of this invention is accomplished by providing two rectifier bridges 103, 104. By such a connection of the bridges 103,104 between the DC input terminals B+,B−, new behavior of the device was discovered. A DC input voltage developed across DC input terminals B+,B−, as per FIG. 10(a) is a result of commonly known rectification of voltage delivered by the AC voltage source 101 and filtering by the capacitor 105.

The device starts oscillation by triggering provided with a commonly known diac circuit (not shown). The converter delivers a constant magnitude voltage and constant magnitude current into the lamp load 112. The frequency of the switching inverter 109 is equal to resonant oscillation frequency of the parallel resonant tank circuit 108 which includes the load 112 connected in parallel to both the resonant inductor primary inductance L11 and the resonant capacitor 110.

A voltage of a modulated magnitude is developed across the terminals 1F3,1F4, and the voltage is a result of drawing of AC current (pulsating) by the converter from the energy storing capacitor 105 connected between terminals B+, B−. The voltage at the terminals 1F3,1F4 is equal to instantaneous difference between the DC input voltage and the rectified, not filtered and pulsating voltage present between terminals 1A3,1A4. The peak magnitude of the DC input voltage is equal to peak magnitude of the rectified AC voltage source 101.

Figure 10B:
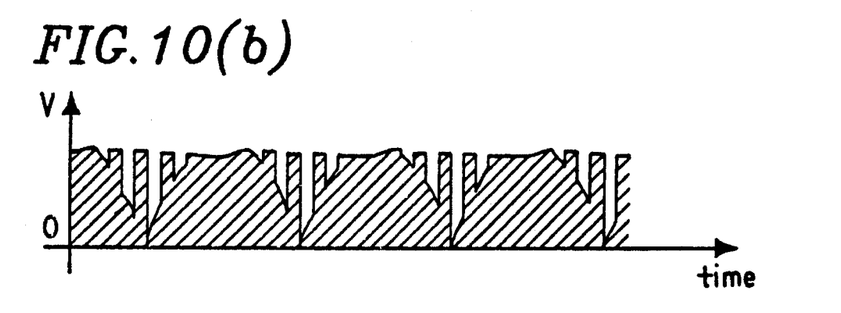
Figure 10C:
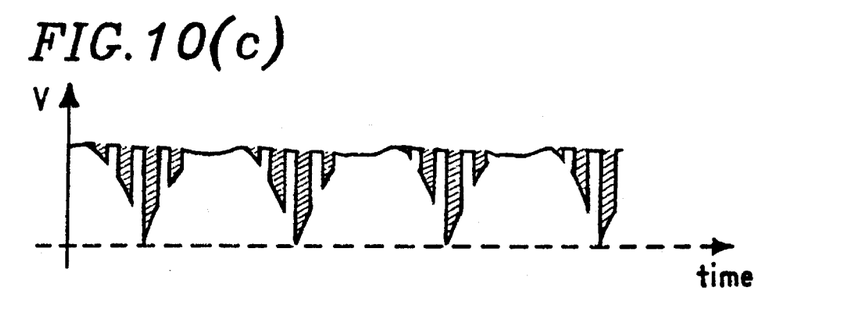
Figure 10D:
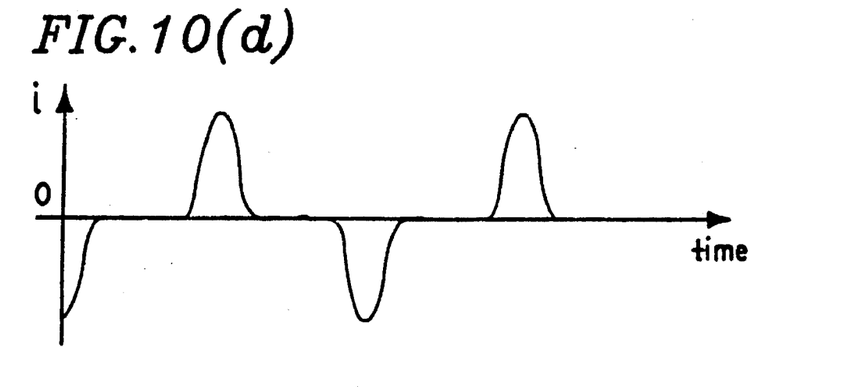

The waveform of the voltage across terminals 1A3,1A4 is presented in FIG. 10(b). A waveform of the voltage developed across terminals 1F3,1F4 is presented in FIG. 10(c). The waveform of the input current is presented in FIG. 10(d).

The oscillation frequency (fo) of the parallel resonant circuit 108 (without the feedback winding L12) can be expressed by the following formula:

$$\omega_o = \frac{1}{\sqrt{L_1 C}} \cdot \sqrt{1 + \frac{L_1}{L_2}\left(\frac{1}{1+\frac{1}{Q^2}}\right)}$$

where:
$\omega_o = 2\pi fo$
$L_1$ = inductance of the resonant inductor 111 measured at its primary side L11;
C = capacitance of the resonant capacitor 110;

R=resistance of the load;
$L_2$=leakage inductance associated with the winding L12
Q=quality of magnetic coupling between the primary winding L11 and the winding L12 at the resonant frequency; and $$\frac{1}{Q} = \frac{R}{\omega L_2};$$

A feedback signal obtained by the switching feedback windings L14,L15 for the self-oscillation of the converter is in phase with an alternating voltage developed at the output terminals 119,120. The frequency obtained always adjusts itself in proportion to instantaneous magnitude of the DC input voltage at the terminals B+,B−. The frequency increases when the DC input voltage increases and lowers when the voltage lowers.

The operation of the device of FIG. 1 when the feedback voltage from the secondary winding L13 of the resonant inductor 111 is provided at terminals 1F1, 1F2 will be referenced to waveforms of FIGS. 11(*a*)–11(*d*).

Whenever the voltage developed across the secondary winding L13 being provided at terminals 1F1,1F2, the interaction of input and output of the device begins. Such an interaction effects in limiting and modulation of the voltage across the secondary winding L13 to a voltage level being present across terminals 1F1,1F2. Thus, the resonant inductor value L is being effectively modulated. Whenever the voltage across the inductor is lower, the effective value of the inductor L become lower. Thus, the frequency of oscillation is modulated accordingly under this condition. Whenever the frequency increases, the impedance associated with the leakage inductance also increases, and current magnitude delivered to the load decreases. Thus, the variations or modulation of the frequency in proportion to DC input voltage produces a new and novel circuit having a constant magnitude current delivered to the load even when the DC input voltage is of strongly modulated magnitude influenced by rectified, not filtered voltage of the AC power line.

The voltage magnitude between terminals 1F1,1F2, as per FIG. 11(*c*) is equal to a difference of instantaneous magnitude of the DC input voltage developed across terminals B+,B− and instantaneous magnitude of rectified, not filtered (pulsating) voltage between terminals 1A3,1A4, the later being provided by rectified AC voltage source and is shown in FIG. 11(*b*). The instantaneous magnitude of the DC input voltage is equal or higher than instantaneous magnitude of the rectified AC voltage source. The parameters of determining the magnitude of the DC input voltage as per FIG. 11(*a*), are: turns ratios of the resonant inductor windings, coupling quality between primary and secondary winding of the resonant inductor. All of the parameters mentioned above are factors in obtaining the device stability and proper operation.

Figure 11A:
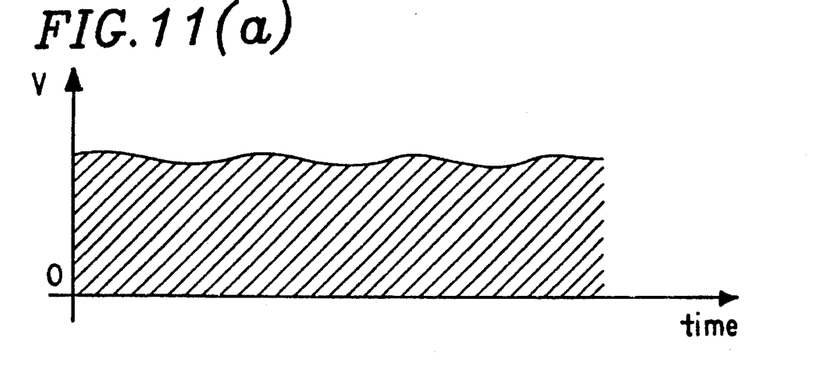
FIGS. 11(a)–(11d) illustrate graphs showing current and voltage waveforms associated with operation of an embodiment of the circuit of the present invention.
Figure 11B:
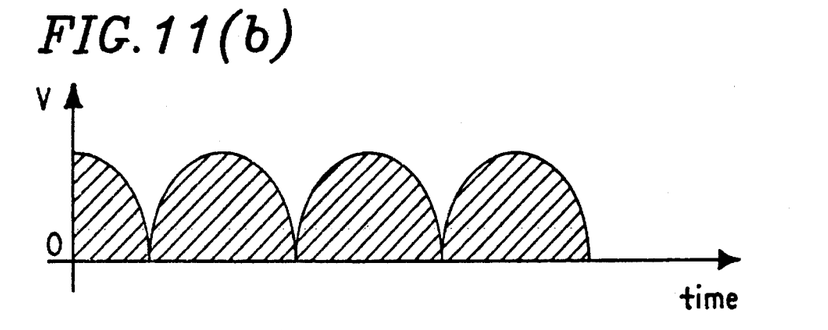
Figure 11C:
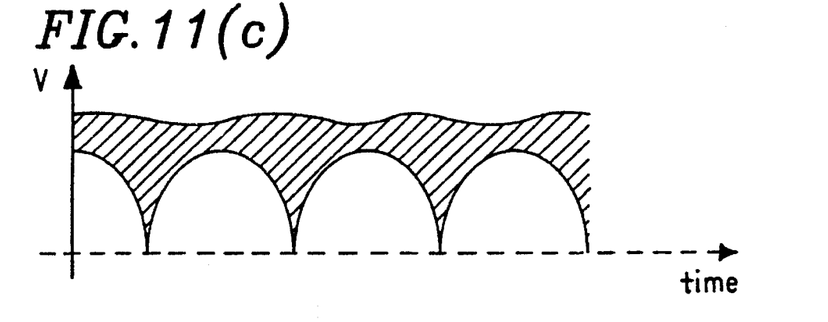
Figure 11D:
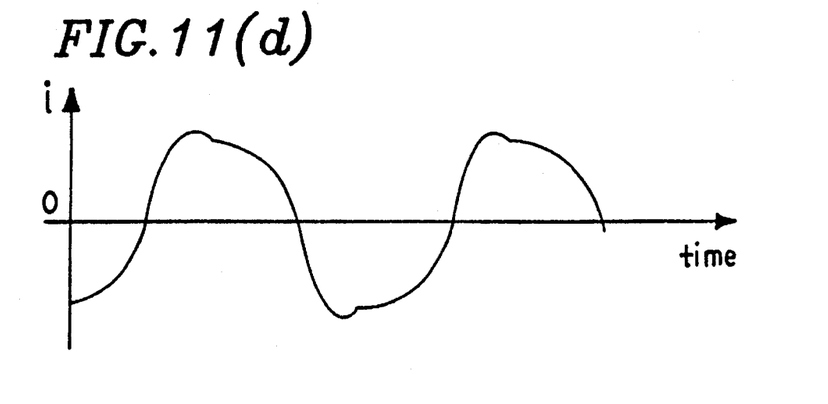

It will be appreciated that due to the feedback provided by secondary winding L13 of the resonant inductor 111 to the bridge 104, the voltage magnitude to which the capacitor 105 is charged, being partially provided by AC voltage source and partially provided by the feedback from resonant inductor 111. Thus, a charging current of the capacitor 105 is partially being provided by AC voltage source, and partially by feedback from the resonant inductor 111. Therefore, the input current waveform, as per FIG. 11(*d*), taken from the AC voltage source is substantially proportional to the voltage waveform of the AC voltage source. The power is drawn from the source with power factor of 0.99, and current taken by the device from the source has total harmonic distortion below 20%.

It will also be appreciated that due to coupling of the resonant inductor voltage, and modulation of its magnitude being proportional to the voltage having instantaneous magnitude equal to the difference between instantaneous magnitude of the DC input voltage and instantaneous magnitude of the rectified AC voltage source, the current magnitude provided to the load is substantially constant. In result, the load current crest factor is below 1.7.

In regards to the device of FIG. 3 which is an alternative version of device of FIG. 1, the inductor 320 improves the input-output energy feedback in circuits made for very low levels of power line voltages, i.e. 100VAC and below. Operation of the circuit is identical to the one described in FIG. 1.

Referring now to device of FIG. 2, the feedback winding is coupled to the ballasting inductor and is connected to the AC terminals of the bridge 204. The effective inductance of the ballasting inductor is modulated here in proportion to the voltage present at the terminals 2F1,2F2. In effect, this device operates to provide the same results as the device of FIG. 1. It may be selected as a design choice when the bobbins design used for the resonant inductor coil will have a limited number of terminals or will not fit the feedback winding on the selected coil size. The device of FIG. 6 is an alternative version of the device of FIG. 2 wherein the inductor 620 provides improvement of the energy feedback in certain cases. The device of FIG. 7 is a further alternative of the device of FIG. 2 wherein the capacitor 720 provides an improvement of the energy feedback in certain other cases.

Referring now to FIG. 5, a combination of the feedback winding L53 and the capacitor 509 is used. The winding L53 is used to modulated an effective value of the resonant inductor 511 as is in the device of FIG. 1. The capacitor, 509 however, is used to modulate an effective value of the resonant capacitor 510. This combination is used in certain cases when precision tuning is desired, and modulation of frequency of oscillation of the inverter is desired to be in certain proportion to changes in magnitude of the voltage present at the terminals 5F1,5F2 to achieve desired results in input current and load current waveforms. The device of FIG. 4 is an alternative version of the devices of FIG. 3 and FIG. 5 and is another embodiment of the present invention.

Referring now to FIG. 8 and FIG. 9, alternative versions of all above described devices singly or in combinations are shown which represent a series of embodiments of the present inventions in push-pull inverter architecture.

It will thus be appreciated that the devices as described herein will provide for substantial stability of its critical parameters (input power, power factor, total harmonic distortion, load current crest factor) despite: large variations of nominal AC voltage source, b) application of other than nominal load type, c) subjecting the devices to low and high temperatures.

It will be appreciated that device as described herein, will be very simple—with very low parts count, easily adaptable to all power line voltages and load types, repeatable in a manufacturing process, and inexpensive.

It will be also appreciated that various other modifications or alternatives to the above described embodiments will be apparent to the person skilled in the art without departing from the inventive concept described herein.

I claim:

1. An energy conversion device employing an electronic converter having DC input terminals and provides a high frequency signal at its output terminals, the device comprising:

voltage source means providing an input current;

first rectifier means having first AC input terminals and first DC output terminals wherein said AC input terminals are connected to the voltage source means;

second rectifier means having second AC input terminals and second DC output terminals wherein said first and second DC output terminals are coupled to the DC input terminals;

capacitor means coupled to the DC input terminals;

semiconductor switching means coupled to the DC input terminals;

resonant oscillator circuit means coupled to the DC input terminals and to the semiconductor switching means wherein said resonant oscillator circuit draws a current from the DC input terminals, and further wherein the resonant oscillator circuit develops an alternating voltage at the output terminals and said oscillator circuit comprises: (i) a resonant inductor having a primary winding coupled to the output terminals; (ii) a resonant capacitor coupled to the output terminals and in parallel with the primary winding of the resonant inductor; and (iii) a switching feedback loop coupled to the resonant inductor and responsive to instantaneous magnitude of the alternating voltage and operable to deliver to the semiconductor switching means a switching signal proportional to the instantaneous magnitude of the alternating voltage; and input-output means coupled to the resonant inductor and connected to AC input terminals of the second rectifier means wherein the input-output means provides (i) a substantially constant magnitude high frequency signal at the output terminals, and (ii) a substantially sinusoidal input current.

2. The device according to claim 1 wherein the voltage source means is a power line AC voltage source.

3. The device according to claim 2 wherein the first and second rectifier means each comprise a full wave rectifier bridge.

4. The device according to claim 1 wherein the capacitor means comprises a polarized electrolytic capacitor.

5. The device according to claim 1 wherein the semiconductor switching means is connected in a bridge configuration having a pair of npn bipolar transitors.

6. The device according to claim 1 wherein the semiconductor switching means is connected in push-pull configuration having a pair of npn bipolar transistors.

7. The device according to claim 1 further comprising:

a load in the form of a gas discharge lamp coupled to the output terminals by a load winding loosely coupled with the primary winding and having an impedance associated with a leakage inductance operating as load current limiting frequency dependent impedance.

8. An energy conversion device employing an electronic converter having DC input terminals and provides a high frequency signal at its output terminals, the device comprising:

voltage source means providing an input current;

first rectifier means having first AC input terminals and first DC output terminals wherein said AC input terminals are connected to the voltage source means;

second rectifier means having second AC input terminals and second DC output terminals wherein said first and second DC output terminals are coupled to the DC input terminals;

capacitor means coupled to the DC input terminals;

semiconductor switching means coupled to the DC input terminals;

resonant oscillator circuit means coupled to the DC input terminals and to the semiconductor switching means wherein said resonant oscillator circuit draws a current from the DC input terminals, and further wherein the resonant oscillator circuit develops an alternating voltage at the output terminals and said oscillator circuit comprises: (i) a resonant inductor having a primary winding coupled to the output terminals; (ii) a resonant capacitor coupled to the output terminals and in parallel with the primary winding of the resonant inductor; and (iii) a ballasting inductor coupled to the DC input terminals and to the semiconductor switching means and (iv) a switching feedback loop coupled to the resonant inductor and responsive to instantaneous magnitude of the alternating voltage and operable to deliver to the semiconductor switching means a switching signal proportional to the instantaneous magnitude of the alternating voltage; and input-output means coupled to the resonant oscillator circuit and to the AC input terminals of the second rectifier means wherein the input-output means provides (i) a substantially constant magnitude high frequency signal at the output terminals, and (ii) a substantially sinusoidal input current.

9. The device according to claim 8 wherein the input-output means is a first feedback winding magnetically coupled to the ballasting inductor and connected to the AC input terminals of the second rectifier means.

10. The device according to claim 9 wherein the input-output means comprises an inductor connected in a series circuit loop with the first feedback winding.

11. The device according to claim 9 wherein the input-output means comprises a capacitor connected in a series circuit loop with the first feedback winding.

12. The device according to claim 8 wherein the input-output means is a second feedback winding magnetically coupled to the resonant inductor and connected to the AC input terminals of the second rectifier means.

13. The device according to claim 12 wherein the input-output means comprises an inductor connected in a series circuit loop with the second feedback winding.

14. The device according to claim 12 wherein the input-output means comprises a capacitor connected in a series circuit loop with the second feedback winding.

15. The device according to claim further comprising:

a capacitor coupled to the resonant capacitor and connected to at least one of the AC input terminals of the second rectifier means.

16. The device according to claim further comprising:

a capacitor coupled to the resonant capacitor and connected to at least one of the AC input terminals of the second rectifier means.

17. An energy conversion device employing an electronic converter having DC input terminals and providing a high frequency signal at its output terminals, the device comprising:

voltage source means providing an input current;

first rectifier means having first AC input terminals and first DC output terminals wherein said AC input terminals are connected to the voltage source means;

second rectifier means having second AC input terminals and second DC output terminals wherein said first and second DC output terminals are coupled to the DC input terminals;

capacitor means coupled to the DC input terminals;

semiconductor switching means coupled to the DC input terminals;

resonant oscillator circuit means having a frequency of oscillation and coupled to the DC input terminals and to the semiconductor switching means wherein said resonant oscillator circuit means draws a current from the DC input terminals, and further wherein the resonant oscillator circuit means develops an alternating voltage at the output terminals and said oscillator circuit means comprises: (i) a resonant inductor having a primary winding coupled to the output terminals; (ii) a resonant capacitor coupled to the output terminals and in parallel with the primary winding of the resonant inductor; and (iii) a switching feedback loop coupled to the resonant inductor and responsive to instantaneous magnitude of the alternating voltage and operable to deliver to the semiconductor switching means a switching signal proportional to the instantaneous magnitude of the alternating voltage;

input-output means coupled to the resonant oscillator circuit and to the AC input terminals of the second rectified means wherein the input-output means provides (i) a substantially constant magnitude high frequency signal at the output terminals, and (ii) a substantially sinusoidal input current; and wherein the instantaneous frequency of oscillation is modulated in proportion to a differential voltage of instantaneous magnitude proportional to a difference between instantaneous magnitude of a voltage developed across the DC input terminals and instantaneous magnitude of a voltage provided by a rectified AC voltage source.

18. The device according to claim 17 wherein a duty cycle of the semiconductor switching means is modulated in proportion to a differential voltage of instantaneous magnitude proportional to a difference between instantaneous magnitude of a voltage developed across The DC input terminals and instantaneous magnitude of a voltage provided by a rectified AC voltage source.

19. An energy conversion device employing an electronic converter having DC input voltage across DC input terminals and provides a high frequency alternating signal at its output terminals and comprising:

a first rectifier receiving a source voltage from an AC power source and providing at first DC output terminals a first pulsating DC voltage;

a second rectifier having AC input terminals and providing at second DC output terminals a second pulsating voltage wherein said second DC output terminals are coupled to the DC input terminals and said first DC output terminals;

an inverter means coupled to the DC input terminals including a semiconductor switching means and resonant oscillator means for generating a high frequency signal;

an energy feedback means connected in circuit between the inverter means and the AC input terminals of the second rectifier means wherein the energy feedback means is operable to deliver to the energy storage means and to the inverter means an instantaneous magnitude of energy proportional to a difference between instantaneous magnitude of the DC input voltage and instantaneous magnitude of the first pulsating DC voltage and wherein the semiconductor switching means conducts electric current during its ON-time and does not conduct electric current during its OFF-time.

20. The device according to claim 19 wherein the energy feedback means comprises a feedback winding coupled to the inverter means and connected to the AC input terminals of the second rectifier means.

21. The device according to claim 20 wherein the energy feedback means further comprises an inductor connected in a series circuit loop with the feedback winding.

22. The device according to claim 20 wherein the energy feedback means further comprises a capacitor connected in a series circuit loop with the feedback winding.

23. The device according to claim 19 wherein the resonant oscillator means having its frequency of oscillation modulated in proportion to a voltage of instantaneous magnitude proportional to a difference between instantaneous magnitude of the DC input voltage and instantaneous magnitude of the first pulsating DC voltage.

24. The device according to claim 19 wherein a duty cycle of each of the semiconductor switching means is modulated in proportion to a voltage of instantaneous magnitude proportional to a difference of instantaneous magnitude of the DC input voltage and instantaneous magnitude of the first pulsating DC voltage wherein the duty cycle is defined as a ratio of the ON-time and the OFF-time of the semiconductor switching means, respectively, during each cycle of the high frequency signal.

* * * * *